(12) United States Patent
Beall

(10) Patent No.: US 10,464,022 B2
(45) Date of Patent: Nov. 5, 2019

(54) PARALLEL PROCESSING REVERSE OSMOSIS WATER FILTRATION SYSTEMS

(71) Applicant: Topper Manufacturing Corporation, Torrance, CA (US)

(72) Inventor: Timothy Allen Beall, Redondo Beach, CA (US)

(73) Assignee: Topper Manufacturing Corporation, Torrance, CA (US)

(*) Notice: Subject to any disclaimer, the term of this patent is extended or adjusted under 35 U.S.C. 154(b) by 0 days.

(21) Appl. No.: 15/647,670

(22) Filed: Jul. 12, 2017

(65) Prior Publication Data

US 2018/0015416 A1   Jan. 18, 2018

Related U.S. Application Data

(60) Provisional application No. 62/514,561, filed on Jun. 2, 2017, provisional application No. 62/460,638, filed on Feb. 17, 2017, provisional application No. 62/361,657, filed on Jul. 13, 2016.

(51) Int. Cl.
*B01D 61/02* (2006.01)
*B01D 61/18* (2006.01)
(Continued)

(52) U.S. Cl.
CPC .......... *B01D 61/022* (2013.01); *B01D 61/08* (2013.01); *B01D 61/18* (2013.01); *B01D 61/22* (2013.01);
(Continued)

(58) Field of Classification Search
None
See application file for complete search history.

(56) References Cited

U.S. PATENT DOCUMENTS

| 4,083,781 A | 4/1978 | Conger |
| 4,801,375 A | 1/1989 | Padilla |

(Continued)

FOREIGN PATENT DOCUMENTS

| EP | 2121169 | 11/2009 |
| EP | 3159312 | 4/2017 |

(Continued)

OTHER PUBLICATIONS

"International Search Report and Written Opinion of the International Searching Authority dated Oct. 13, 2017; International Application No. PCT/US2017/042016", Oct. 13, 2017.

(Continued)

*Primary Examiner* — Krishnan S Menon
(74) *Attorney, Agent, or Firm* — Womble Bond Dickinson (US) LLP

(57) ABSTRACT

Parallel processing reverse osmosis water filtration systems using multiple RO (reverse osmosis) filter systems having their raw water input connections coupled together, their product water output connections coupled together and their drain connections coupled together. Using appropriate valving, any one or more reverse osmosis filter systems may be decoupled from the rest of the system for servicing without shutting down the entire system, and one or more additional reverse osmosis filter systems may be added to increase the product water output capacity when needed. Optional features disclosed include enhanced product water storage capacity, control of the total dissolved solids in the product water dispensed, and protection against leaks that may disable one RO filter system, but not the entire parallel processing reverse osmosis water filtration systems. Various embodiments are disclosed.

8 Claims, 12 Drawing Sheets

(51) Int. Cl.
  *B01D 61/22* (2006.01)
  *B01D 61/58* (2006.01)
  *C02F 1/44* (2006.01)
  *B01D 61/08* (2006.01)
  *C02F 1/00* (2006.01)
  *B01D 61/10* (2006.01)
  *B01D 61/12* (2006.01)
  *C02F 1/28* (2006.01)

(52) U.S. Cl.
  CPC .............. *B01D 61/58* (2013.01); *C02F 1/003* (2013.01); *C02F 1/441* (2013.01); *B01D 61/10* (2013.01); *B01D 61/12* (2013.01); *B01D 2311/14* (2013.01); *B01D 2311/2626* (2013.01); *B01D 2311/2649* (2013.01); *B01D 2313/105* (2013.01); *B01D 2313/44* (2013.01); *B01D 2313/50* (2013.01); *B01D 2317/04* (2013.01); *C02F 1/283* (2013.01); *C02F 2201/007* (2013.01); *C02F 2307/10* (2013.01)

(56) References Cited

U.S. PATENT DOCUMENTS

| | | | | |
|---|---|---|---|---|
| 6,093,312 | A * | 7/2000 | Boulter | ................ B67D 1/0009 210/86 |
| 6,110,360 | A | 8/2000 | Hart, Jr. | |
| 7,601,256 | B2 | 10/2009 | Beall | |
| 7,726,511 | B2 | 6/2010 | Beall | |
| 7,763,171 | B2 | 7/2010 | Beall | |
| 9,731,984 | B2 | 8/2017 | Beall | |
| 2006/0138031 | A1 * | 6/2006 | Kloos | ................... B01D 61/022 210/96.2 |
| 2007/0045165 | A1 | 3/2007 | Beall | |
| 2007/0045327 | A1 | 3/2007 | Beall | |
| 2007/0289904 | A1 * | 12/2007 | Oklejas | ................ B01D 61/022 210/87 |
| 2008/0203026 | A1 | 8/2008 | Beall | |
| 2015/0336814 | A1 | 11/2015 | Beall | |
| 2017/0297927 | A1 | 10/2017 | Beall | |

FOREIGN PATENT DOCUMENTS

WO WO-2008/100544 8/2008
WO WO-2009/097369 8/2009

OTHER PUBLICATIONS

Ningbo Homaster Electrical Applicances Co., Ltd., "Leak Shut Off Valve (HDJM-J01) Product Information", downloaded from https://water-dispensers.en.made-in-china.com/print/qXMJmERBvaYb/China-Leak-Shut-off-Valve-HDJM-J01.html, undated, 2 pp. total.

* cited by examiner

PARALLEL PROCESSING REVERSE OSMOSIS WATER FILTRATION SYSTEMS

CROSS-REFERENCE TO RELATED APPLICATIONS

This application claims the benefit of U.S. Provisional Patent Application No. 62/361,657 filed Jul. 13, 2016, U.S. Patent Application No. 62/460,638 filed Feb. 17, 2017, and U.S. Provisional Application No. 62/514,561 filed Jun. 2, 2017, the entireties of which are incorporated herein by reference.

BACKGROUND OF THE INVENTION

1. Field of the Invention

The present invention relates to the field of reverse osmosis water filtering systems.

2. Prior Art

Reverse osmosis water filtration systems are well known in the prior art. Generally speaking, such systems, as in the present invention, receive feed water to be filtered from a pressurized water source, which may be a municipal water source, though in some instances will be pressurized well water, pressurized water from some other source, etc., and provide product water to any one of three commonly used product water storage devices.

The first product water storage device used is simply a container for holding product water at atmospheric pressure and allowing the dispensing of the same by gravity. Systems that store product water in an unpressurized container have an advantage, in that the reverse osmosis filtration system is not subjected to a product water back pressure, and accordingly, is subject only to variations in the pressure of the feed water. They have a strong disadvantage, however, in that dispensing under gravity limits the placement of the dispenser and tends to similarly limit the rate at which the product water may be dispensed using a dispensing valve of ordinary proportions. Such systems are also not suitable for providing product water to appliances such as ice makers unless a pump is added to the system.

The second type of product water storage device is an air captive accumulator wherein the product water is stored in a storage vessel having a diaphragm separating air or other gas (compressible) on one side thereof from the product water on the other side of the diaphragm. Thus as product water is added to the container, the air pressure increases from whatever initial air pressure was selected, with the pressure on the product water in the accumulator providing a driving force which may be used for dispensing of the water. Such product water storage devices are commonly referred to as air captive storage systems or air captive accumulators.

Storing the product water in an air captive storage system has an advantage of providing pressure for dispensing of the product water, albeit a varying pressure dependent on how "full" the air captive accumulator is at the time of dispensing. The air captive storage system, however, has a disadvantage, in that it creates a back pressure on the reverse osmosis filtration system, slowing the rate of production of product water as the pressure in the air captive accumulator increases during production of product water. This has a number of disadvantages, not only including a reduction in product water production, but further in creating a widely variable pressure differential across the reverse osmosis filter, preventing optimizing of the filter characteristics because of that varying pressure.

A third product water storage device referred to herein as a controllable squeeze water pressure system which uses product water on one side of a membrane and feed water on the other side of the membrane, typically after the feed water flows past the reverse osmosis membrane. By control of the feed water pressure on the feed water side of the membrane between atmospheric pressures and full feed water supply pressures, the controllable squeeze water pressure system may operate with essentially atmospheric pressure as a back pressure during the production of product water, yet can be pressurized at the full feed water source pressure as membrane "squeeze water" to provide a constant pressurization during dispensing of product water. Systems of this type include U.S. Pat. No. 7,601,256 entitled "Reverse Osmosis Filtration Systems" and U.S. Pat. No. 7,726,511 entitled "Reverse Osmosis Filtration System Storage Tanks", among others.

Systems that use a control valve to control feed water pressure on one side of a bladder in a storage container, with product water being stored on the other side of a bladder, have the advantages of essentially no back pressure on the reverse osmosis filter when producing product water, yet essentially full feed water source pressure on the product water during dispensing. Of course, such operation should be automatic, though a control valve in accordance with U.S. Pat. No. 6,110,360 entitled "Low Pressure Reverse Osmosis Water Purifying System" can work very well in such applications, allowing full automatic operation of the controllable squeeze water pressure system, including complete shutoff of the system when not producing product water (storage tank full) and optimization of the product water production rate because of the relatively constant differential pressure across the reverse osmosis membrane.

In general, any of the foregoing systems may be assembled from components of various sizes to obtain a reverse osmosis water filtration system of substantially any desired size. As such, larger systems tend to be assembled on site where labor costs are the highest, with very few small systems being available for residential use. The output capacity of such systems is also not easily increased at a later date if needed. The only system known for use above or below counter that is fully self-contained, requires no electricity and provides product water under pressure for dispensing for coupling to an ice maker or whatever, is the system in accordance with U.S. Pat. No. 7,601,256 referred to above. That system is ideal for home use, though its capacity may be less than required for small restaurants and coffee shops, such as required by small family operated businesses.

FIG. 1 is an illustration of the basic reverse osmosis filtration system of U.S. Pat. No. 7,601,256. Visible in this Figure is a product water storage tank 22, generally in accordance with U.S. Pat. Nos. 7,726,511 and 7,763,171, incorporating a controllable squeeze water pressure system as previously described in U.S. Pat. Nos. 7,601,256, 7,726, 511 and 7,763,171. The product water storage tank 22 supports a manifold assembly 24 comprised of upper and lower plastic manifold plates hot-welded together, which in turn supports an activated charcoal filter 26, an RO (reverse osmosis) filter 28 and a conventional filter 30. These filters, as well as the product water storage tank 22, connect to the manifold assembly 24 by bayonet type connectors (a form of quick connect/disconnect connector) for easy assembly and removal, particularly of the filters, for replacement as required as part of the normal operation and maintenance of the RO (reverse osmosis) filter system 20 illustrated. Thus the filters 26, 28 and 30 as well as the product water storage tank 22 can be assembled to the manifold assembly 24 without the use of tools, even hand tools. In that regard, note that activated charcoal filter 26, RO filter 28 and conventional filter 30 have their bases elevated with respect to the base of product water storage tank 22 to provide clearance for removal and replacement of these filters, as required.

Also visible in FIG. 1 is the water input connection 32 of the pressure regulator in this system, generally in accordance with U.S. Patent Application Publication No. 2015/0336814. The pressure regulator 34 itself is illustrated in FIG. 2 as a self-contained pressure regulator having its regulated output connected through line 36 to the feed water input 37 to the manifold assembly 24. Also shown in FIG. 2 is the control valve 39, generally in accordance with U.S. Pat. No. 6,110,360 previously referred to, which provides for automatic control of the self-contained RO filter systems 20.

More details of the RO filter system 20 may be found in the foregoing patents.

Currently there is very strong competition between restaurants and coffee houses, as well as vendors of equipment therefor, to produce the best coffee possible. It is believed that the best coffee is produced using water with a total dissolved solid content of 150 parts per million. Frequently, tap water is substantially higher than that, and can easily run over twice that value or higher. Reverse osmosis filtration systems grossly reduce the total dissolved solids content of the water, though tend to do so on a percentage basis, so that the total dissolved solids in the product water produced by a reverse osmosis filter will depend on the total dissolved solids in the raw water provided to the reverse osmosis filter. Accordingly, if the product water of a reverse osmosis filter is used in the making of such coffee, the amount of total dissolved solids which must be added back to the reverse osmosis product water will vary, dependent upon the characteristics of the water which was filtered by the reverse osmosis filter, which can vary with time, the extent of recent rain, etc. In that regard, remineralization filters are also known, but these are not the true solution to the problem, as the amount of remineralization of reverse osmosis product water that is needed is not known until that product water can be tested.

DETAILED DESCRIPTION OF THE PREFERRED EMBODIMENTS

The present invention utilizes a plurality of reverse osmosis filtration systems, preferably but not necessarily totally self-contained systems, in a parallel connection whereby the parallel connection of N such systems will provide a product production rate N times that of a single system, and an output flow rate that can be up to N times that of a single system, which at times could be required if the parallel combination of systems is coupled to supply product water to a plurality of independently operating automatic devices utilizing the product water, which on occasion, might all require product water at the same time. Examples of such appliances would include ice cube makers, coffee machines, and other dispensing machines.

Figure 3:
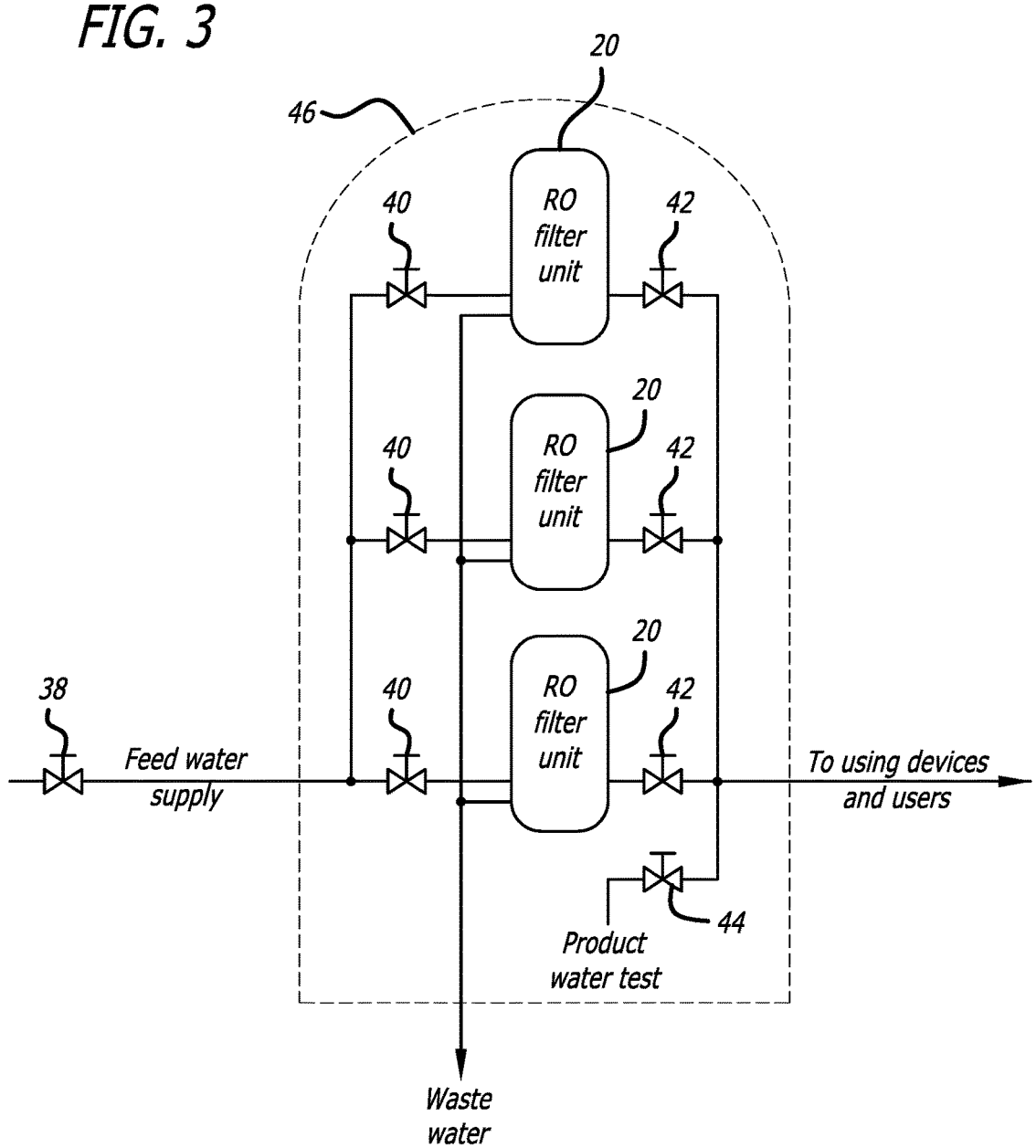
FIG. 3 is a schematic diagram illustrating an exemplary embodiment of the present invention.

An exemplary parallel processing reverse osmosis water filtration system in accordance with the present invention is shown in schematic form in FIG. 3. As shown in this Figure, three RO filter systems 20 are effectively coupled in parallel, with the feed water being supplied to all three RO filter systems through the feed water supply line coupled to some source of pressurized water through a manually operated on/off valve 38. Thus manually operated on/off valve 38 can be used to shut off the entire system if for some reason the system is not to be used for a prolonged period. Similarly, the feed water is supplied to each individual RO filter system through a respective on/off valve 40 so that individual RO filter systems may individually be shut off. Note that the term on/off valve as used in this disclosure and in the claims that follow, means a valve that may be used to allow flow or to block flow, and may include needle valves, globe valves, etc., though clearly such valves are not preferred because of the multiple turns of the handle that is required to go from full open to full closed, and the inability to discern their state by a simple glance at their handle.

The outputs of the RO filter systems 20 are coupled through manually operated on/off valves 42 to provide product water output to using devices and users themselves, as well as to provide a product water test line through product water test valve 44. The system is completed by the parallel connection of the waste water lines of the three RO filter systems 20 to a single waste water output line. Individual valves may be placed in the waste water lines of each individual RO filter system 20, though since these lines are unpressurized and carry only waste water, these lines may be easily plugged in the unlikely event an RO filter system 20 needed to be temporarily removed from the parallel processing reverse osmosis water filtration system.

Figure 1:
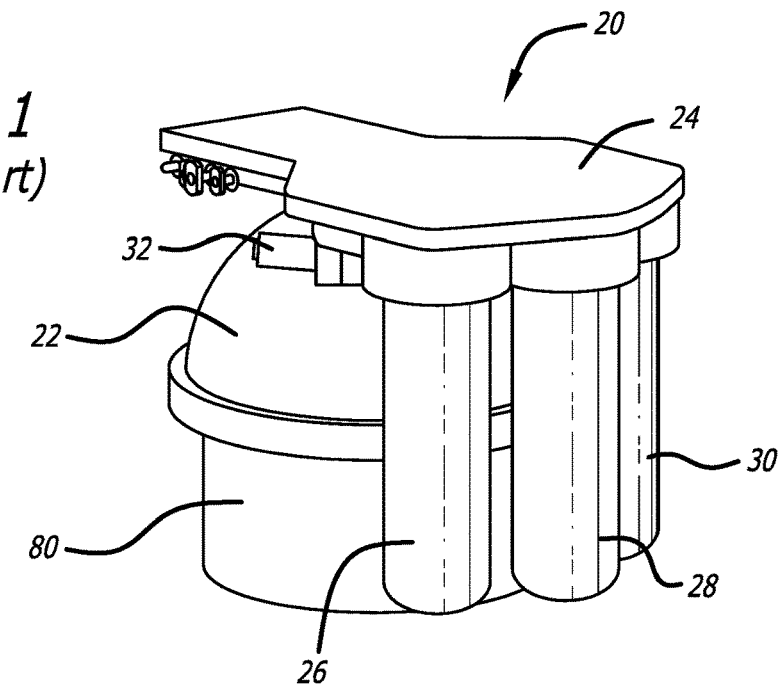
FIG. 1 is a perspective view of a prior art RO (reverse osmosis) filter system.

Note that in a system in accordance with FIG. 3, two of the three manually operated on/off valves 42 may be closed and product water test valve 44 opened to allow product water testing of the output of any of the three RO filter systems 20 having its respective manually operated on/off valve 42 open at the time of the test. Secondly, any one of on/off valves 40 and its respective manually operated on/off valve 42 may be closed during maintenance, allowing the change of any of the filters (26, 28 and/or 30 of FIG. 1), reverse osmosis or otherwise, in the respective RO filter system 20. This, of course, allows the remaining RO filter systems 20 to be fully operative at that time. Similarly, in the unlikely event there is some problem yet to be diagnosed, such as an unsuspected and undiagnosed leak, manually operated on/off valve 38 supplying the entire system may be turned off to shut down the entire system for troubleshooting. Thus, any one RO filter system 20 may be isolated from the rest of the system for any reason whatsoever, with the rest of the system being fully operative during the period of such isolation, but at a reduced capacity, though only during the period of such isolation.

A system in accordance with FIG. 3 has numerous advantages, some of which have already been described, specifically relating to the maintenance of substantially any aspect of the system while the remainder of the system remains fully operative. Further, the system obviously is scalable, a small mom and pop restaurant using a system having perhaps two RO filter systems 20 for the ice cube and coffee makers, with additional RO filter systems 20 being added as the business grows. In that regard, even the decorative enclosure 46 may be made in identical stackable sections matching in size and height the spacing of the RO filter systems 20 in a suitable, similarly scalable support structure or shelving so that the RO filter systems 20 may be stacked higher in greater numbers using identical functional, as well as decorative, components for the parallel processing reverse osmosis water filtration system.

Cost is another advantage of the present invention. In particular, the RO filter systems 20 are thoroughly developed, well tested and highly reliable mass produced RO filter systems, which holds the cost of each RO filter system 20 down in comparison to an individually manufactured reverse osmosis water filtration system. Further, the scalability offers a further cost advantage, in that one need not double the product water capacity by putting in a second, third or fourth identical system, but rather can add reverse osmosis filtration capacity in fixed increments as the business grows. Further, because the RO filter systems 20 are mass produced, there normally will be many qualified installer/maintenance people available for installation and periodic filter service, as well as for providing other maintenance services should other such services be needed. Accordingly, for the foregoing reasons, parallel processing of RO filter systems provides a lost cost, scalable solution to the reverse osmosis filtering requirements of small restaurants and refreshment vendors, and is particularly advantageous using self-contained, mass produced RO filter systems which have complete automatic operation without any electrical connection thereto. Consequently, the installation of such a system involves a minimum of custom on-site plumbing, wherein the system may be placed in any location desired without requiring an electrician to run power to that location.

Figure 4:
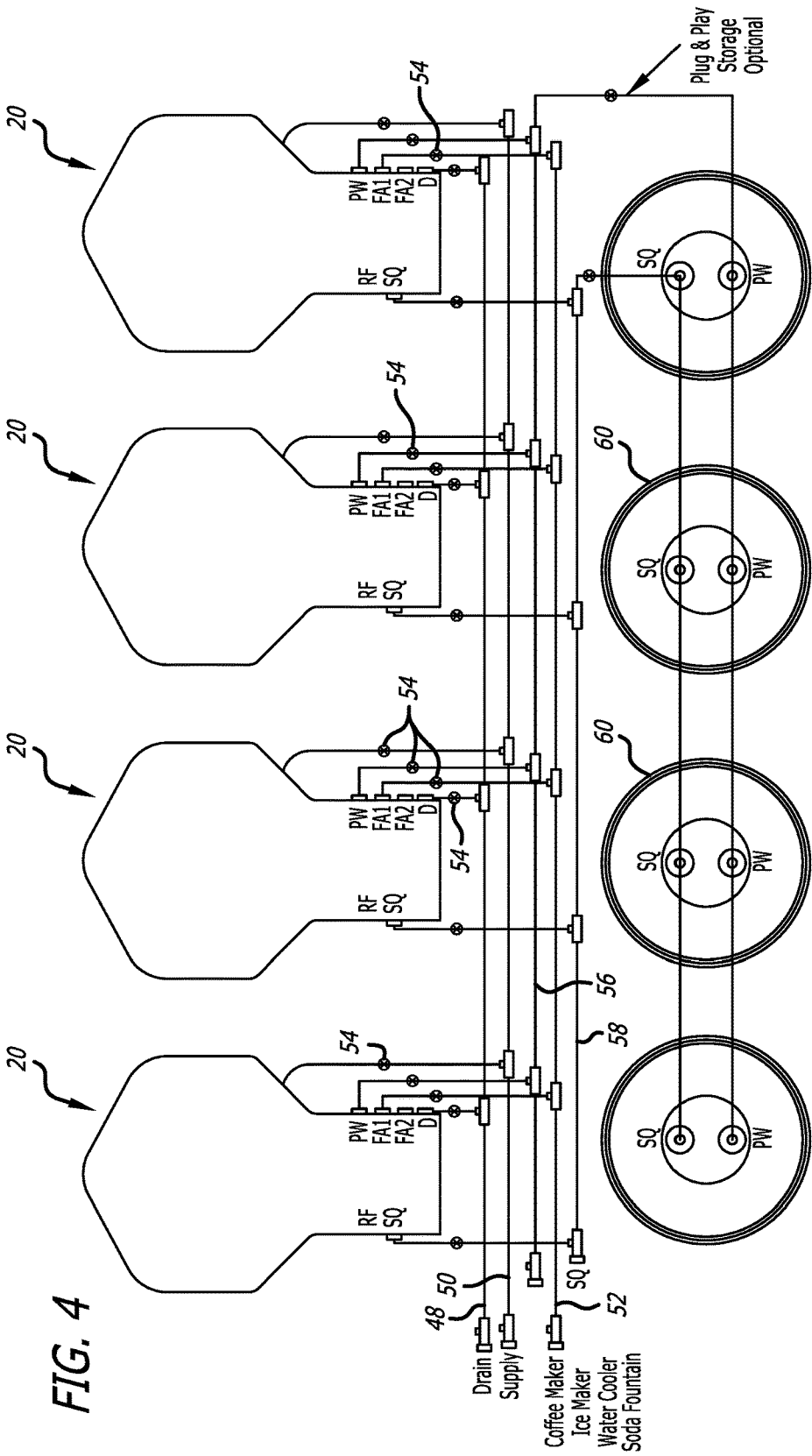
FIG. 4 is a schematic diagram illustrating a parallel connection between multiple RO filter systems of FIG. 1 which includes optional additional product water storage tanks.

Now referring to FIG. 4, a schematic representation of the interconnection of four RO filter systems 20 together with optional additional product water storage tanks 60 may be seen. In this Figure, the four RO filter systems 20 are coupled to a drain line 48, a feed water supply line 50 and a product water output line 52, which in one embodiment is comprised of a color coded harness with on/off ball valves 54 in each line to the RO filter systems 20 for isolation of each individual RO filter system for filter servicing, product water testing, etc., as previously described. Also shown are two additional lines, namely, product water line 56 and squeeze water line 58, which interconnect the optional additional product water storage tanks 60 with the RO filter systems 20. In particular, product water line 56 is a second product water output connection to the RO filter systems 20, with squeeze water line 58 being a squeeze water connection to the RO filter systems 20. The optional additional product water storage tanks 60 are of the squeeze water type storage tanks, which may be of plastic or metal construction having a bladder therein very much like the product water storage tanks 22 of the RO filter systems 20 as previously described.

If the optional additional product water storage tanks 60 are not used and product water line 56 and squeeze water line 58 are not present, then because of the interconnection of the product water output lines 52, if no dispensing is occurring, none of the RO filter systems 20 will shut off when the respective storage tank fills unless all are filled, as the pressure of the product water in the respective RO filter system 20 will not increase to turn the respective system off until all product water storage tanks 22 of all the RO filter systems 20 are filled. Similarly, if dispensing of product water begins because of the activation of an appliance connected thereto, such as a coffee maker, an ice maker, a water cooler or soda fountain, as examples, the drop in pressure in the product water output line 52 has been found to turn on (produce product water) all RO filter systems 20 in a parallel processing reverse osmosis water filtration system, though if the dispensing of product water is at a rate less than the rate of product water production by all RO filter systems 20 themselves, obviously at least one or more such RO filter systems 20 must shut off. The important point here, however, is the fact that no system oscillation occurs, or at least no oscillation is detectable, either audibly or in irregular flow of the product water being dispensed.

Thus with the optional additional product water storage tanks 60 and product water line 56 and squeeze water line 58 in place as illustrated in FIG. 4, because the product water pressure in product water output line 52 will stabilize at the make product water pressure, the product water pressure required to shut off any of the RO filter systems 20 will not be present until the storage tanks on all of the RO filter systems 20 as well as the optional additional product water storage tanks 60 are full and production of product water will be at a maximum rate until all storage tanks are full. Thus a system such as that shown in FIG. 4 is truly a parallel processing system.

Referring again to FIG. 4, it will be noted that the number of the optional additional product water storage tanks 60 is equal to the number of RO filter systems 20. However, there is no such requirement, and the number of such optional additional storage tanks could be less than or even greater than the number of RO filter systems 20, as desired. In that regard, the size of the optional additional product water storage tanks 60 is, itself, a matter of choice, though one possibility is to simply use the product water storage tanks 22 (FIG. 1), which normally connect to the manifold assembly 24 by way of a bayonet type connector, and simply provide a mating bayonet type connector to both cap off and provide the squeeze water and product water connections between the optional storage tank and the squeeze water line 58 and product water line 56. If one such optional additional storage tank was used for each RO filter system 20, the total storage per RO filter system 20 would effectively be doubled, thereby allowing the RO filter systems 20 to produce and store water overnight, eliminating or at least deferring the need for one or more additional RO filter systems 20 at substantially less cost than another complete RO filter system 20.

The illustration in FIG. 4 of course suggests an alternate physical arrangement of the multiple RO filter systems 20, specifically on a shelf as opposed to the stacked arrangement of FIG. 3. Such a shelf might be under a work table, for instance, or on a wall over a storage space, by way of example, as obviously there is no reasonable limit on the relative positions or the number of the multiple RO filter systems 20 in any particular installation.

Figure 5:
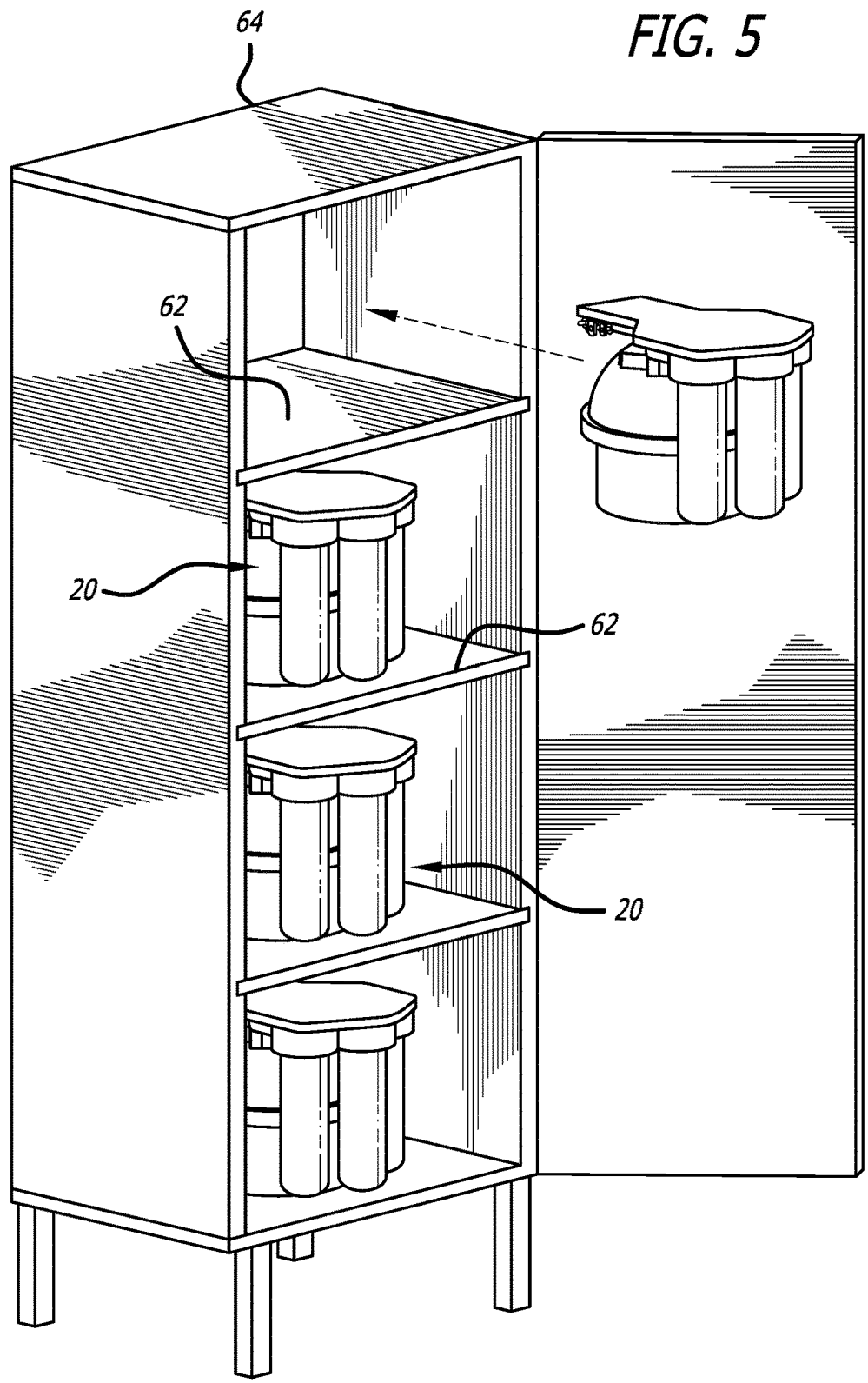
FIG. 5 is a perspective view of an enclosure for parallel processing reverse osmosis water filtration systems of the present invention with the enclosure open.

Now referring to FIG. 5, an illustration of an enclosure 64 for the stacking of multiple RO filter systems 20, as in FIG. 3, may be seen. While the RO filter systems could be stacked one directly on another, the simple stacking of one RO filter system on top of another RO filter system would make it difficult to remove a lower RO filter system, if it ever became necessary to do so, for repair or replacement without essentially shutting down the whole system. Further, it may not be best to require the lower RO filter systems to support the load of the upper RO filter systems. Thus as shown in FIG. 5, enclosure 64 with shelves 62 is provided to receive the multiple RO filter systems 20, three being shown, with a fourth shelf 62 being empty. The RO filter systems 20 are positioned on the shelves with activated charcoal filter 26, RO filter 28 and conventional filter 30, which require periodic replacement, facing forward for easy removal and replacement. Shelves that could be pulled forward for better access to the RO filter system thereon could be used if desired, though unless the enclosure 64 was fastened down or to a wall, such shelving might render the enclosure unstable, and the cost of such shelving is generally not justified. In that regard, note that the filters that need replacement are easily accessible and have adequate clearance thereunder because of their limited length to be removed and replaced without otherwise disturbing the rest of the respective RO filter systems. Similarly, if any such RO filter system requires removal, on/off ball valves 54 (FIG. 4) will allow the water connections thereto to be released without disturbing the operation of the rest of the RO filter systems 20. In that regard, on/off ball valves 54 of FIG. 4, and any other non-metering valves used in the system, preferably are ball valves which have numerous advantages in such an application. In particular, they are easy and relatively inexpensive to produce, provide a reliable seal when shut off, require only a 90° turn between fully opened and fully closed positions, and are normally configured so that one can see at a glance whether a valve is open or closed. All of these points are particularly important, both from a cost and system operational standpoint.

Figure 6:
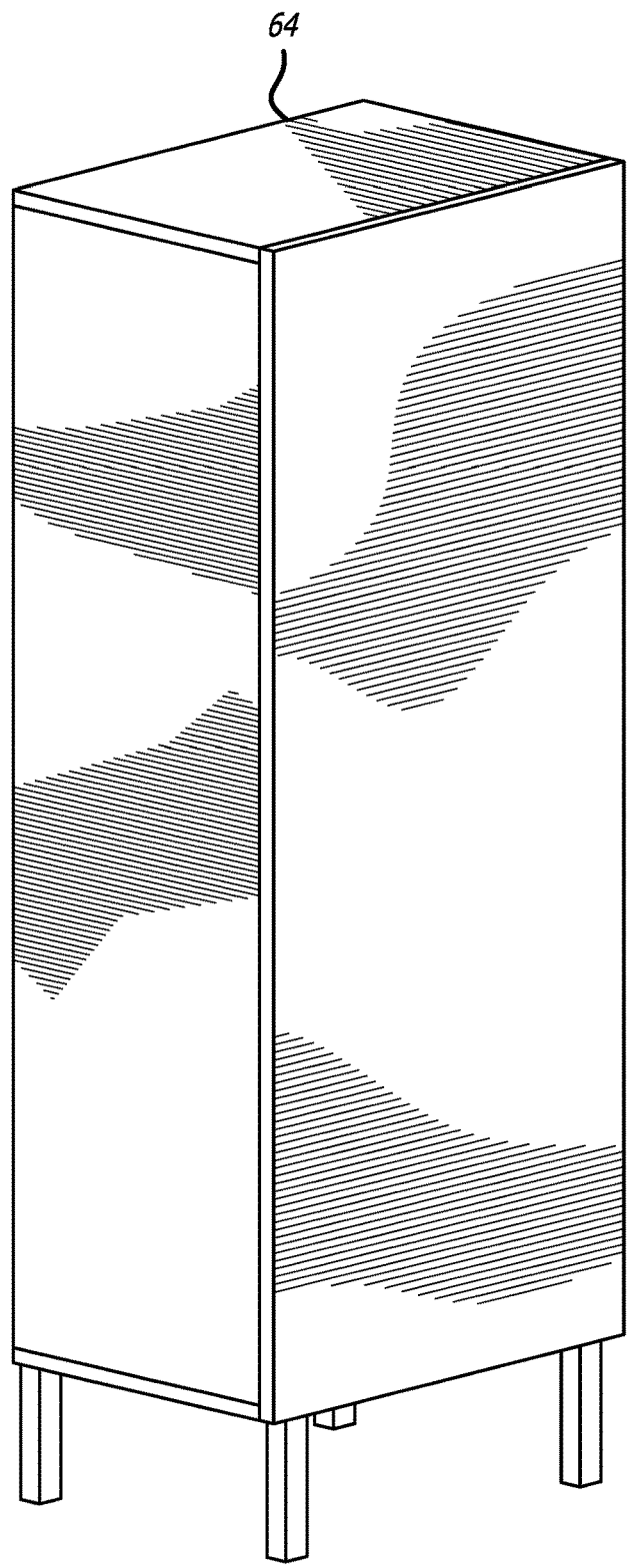
FIG. 6 is view of the enclosure of FIG. 5 in a closed condition.

Now referring to FIG. 6, a view of the enclosure 64 with the enclosure closed may be seen. With respect to such an enclosure, it is recognized that there is a need for sanitary conditions, no matter where the installation, use and maintenance of the present invention systems occurs. Further, it should be recognized that the enclosure 64 may be placed in practically any location that may be available, ranging from a storage area out of normal view, to a food prep area, and in an area, food prep or otherwise, that may or may not be visible to customers. For that reason, the enclosure 64 should be aesthetically pleasing and easy to clean, both within the enclosure and thereunder. Whatever the nature of the enclosure, it should be on legs to allow cleaning thereunder, and at least somewhat ventilated to eliminate moisture that could be released on changing filters, etc. Further, with respect to hinged doors, there may be installations where it would not be possible to open a door to the left, and other installations where it would not be possible to open a door to the right, and of course possibly some installations where there would not be room to open doors in either direction. Consequently, while hinged doors are a definite possibility, slide out panels or lift off panels are another possibility. Actually, the possible choices and variations in design and construction materials are essentially endless, with the ideal being readily serviceable, adaptable to the broadest space limitations and easily cleanable, but preferably no longer or wider than necessary. Since the enclosure may be rather tall, a provision for fastening to a wall may be provided.

Figure 7:
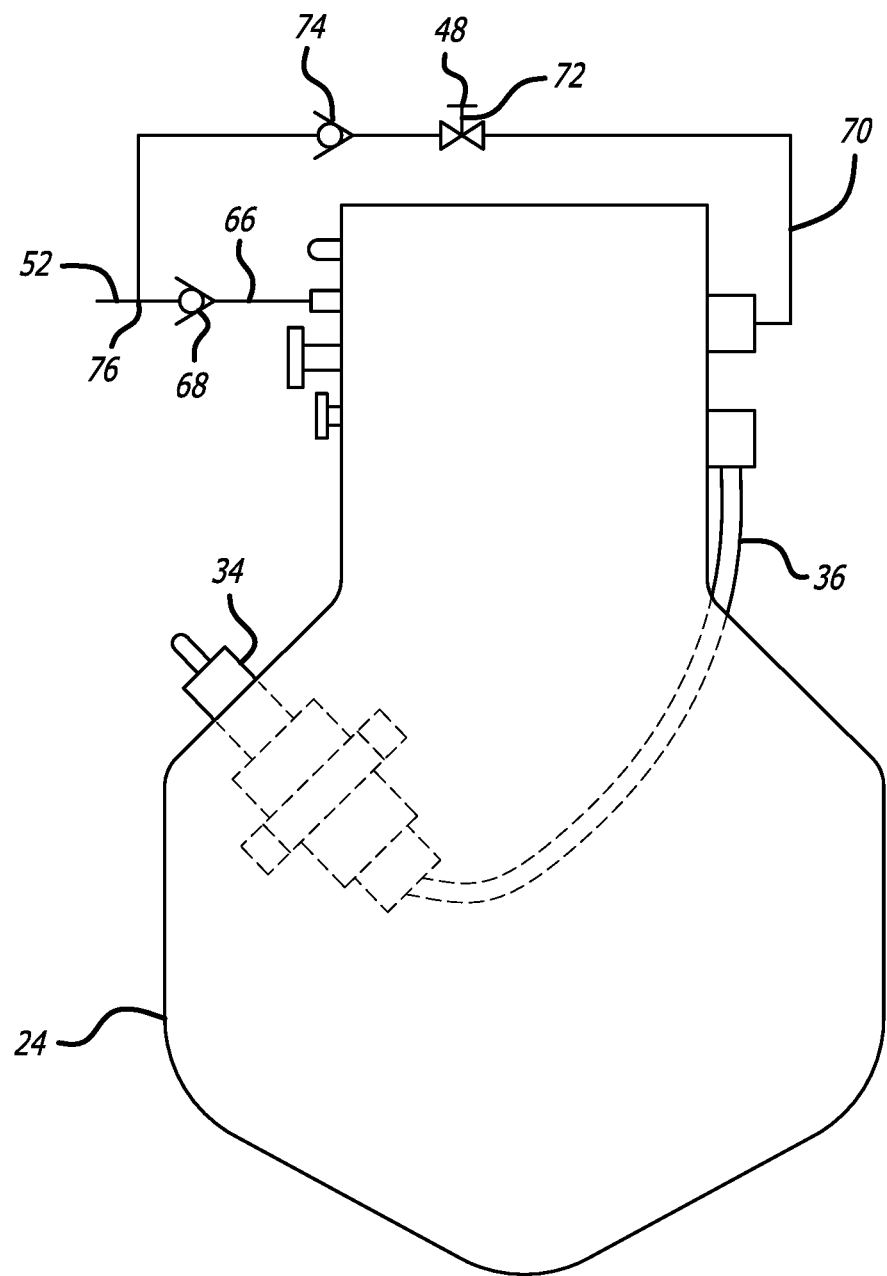
FIG. 7 is a schematic view of the typical interconnection of each RO filter system as configured to provide a control for the total dissolved solids in the product water produced by the parallel processing reverse osmosis water filtration systems of the present invention.

Now referring to FIG. 7, another feature that may be advantageously incorporated into the present invention is illustrated. In particular, this feature provides parallel processing reverse osmosis water filtration systems that produce reverse osmosis product water which has a readily controllable and adjustable total dissolved solids content, as may be desired for coffee making and the like. As shown in FIG. 7, water from the water supply enters the system through pressure regulator 34, with supply water at the regulated pressure entering the manifold assembly through line 36. That water is then provided through the manifold assembly 24 to conventional filter 30 (FIG. 1), then to RO filter 28 and then part to the drain as waste water and part through the reverse osmosis filter to the product water storage tank 22, at least when the system is producing product water. When the product water storage tank 22 is full and product water is not being dispensed, all water flow is shut off by the control valve. When being dispensed, product water will flow through line 66, check valve 68 and T-connection 76 to product water output line 52.

Line 70 is effectively coupled to the squeeze water region between the bladder and the wall of product water storage tank 22, with line 70 having a needle valve 72 therein acting as a throttling or metering valve, and a second check valve 74 before the flow therethrough is joined by T-connection 76 with the product water flow through line 66, etc. for the final output when product water is being dispensed.

The system herein described operates as follows. During the production of product water, when product water storage tank 22 is not full and product water is not being dispensed, the pressure in line 66 and product water output line 52 will be approximately 50% of the regulated pressure in line 36, a result of the control valve used. At this time, the squeeze water in line 70 will be vented, though backflow through line 70 is prevented by the check valve 74. When product water storage tank 22 is filled, line 66 will reach the full regulated line pressure. Still, the squeeze water in line 70 will be vented, though backflow through line 70 is still prevented by the check valve 74. Consequently, both during product water production and the quiescent state of the system when the product water storage tank 22 is full, there will be no flow in either lines 66 or 70. However, when the pressure in product water output line 52 drops when a faucet or other appliance coupled thereto is opened, the control valve referred to and mounted below the manifold assembly couples the water in line 36 at the regulated pressure through conventional filter 30 to the RO filter 28 directly from around the RO filter 28 to the region between the bladder in product water storage tank 22 and the storage tank wall, thereby providing squeeze water at the full regulated line pressure from line 36 to pressurize the product water for delivery through line 66 and product water output line 52. At the same time, the same increase in squeeze water pressure from a vented condition to full regulated line pressure will cause a selectable and controllable flow through needle valve 72, check valve 74 and T-connection 76 to mix with the reverse osmosis product water that is being discharged through line 66.

Accordingly, during dispensing, and only during dispensing, a controlled proportional flow of raw water which has not passed through the RO filter 28 will be mixed with reverse osmosis product water to increase the total dissolved solids to the desired level. In that regard, the total dissolved solids in the water being dispensed through product water output line 52 is easily measured by measuring its electrical conductivity, with the amount of total dissolved solids in product water output line 52 being readily adjustable by adjustment of the needle valve 72. Note that the adjustment is not adjusting the product water produced by the basic reverse osmosis system, but rather is adjusting the amount of raw or waste water that is mixed with the reverse osmosis filter system product water. Consequently, in making this adjustment, one need not make an adjustment and then wait for production of product water at the new setting to see whether the new setting is proper, but rather one can adjust the setting and then make a measurement substantially immediately to verify the new setting is proper. Since the measurement of total dissolved solids is such an easy measurement and the effects of an adjustment can be determined substantially immediately, such adjustments may be made as frequently as desired without disturbing the operation of the system.

Note that the foregoing cannot be achieved with air captive systems described herein in the prior art section, as the only available source of water that hasn't passed through the reverse osmosis filter will be at line pressure, at a regulated pressure if a pressure regulator is used, or some fraction of one of these pressures. In any case, this would create an adjustable flow rate of water that hasn't passed through the reverse osmosis filter, but still result in a flow rate that would not respond to the diminishing product water dispensing rate as the quantity of stored product water in the storage tank is reduced and the pressure of the captive air or gas similarly reduces. Thus the total dissolved solids in the water that would ultimately be dispensed by such an air captive system could easily double during dispensing from a nearly full product water storage tank to a nearly empty product water storage tank, defeating the true purpose of the invention.

In the foregoing description, a specific squeeze water product water accumulator and product water dispensing system was used, as was a specific control valve. While a squeeze water type storage and dispensing system needs to be used and preferably the pressure regulator hereinbefore referred to should be used, other control valves and/or other reverse osmosis filtration systems having different structures may be used, as desired. Of particular importance is that the squeeze water, or a pressure responsive to squeeze water pressure, be used to eject a controlled amount of un-reverse osmosis filtered water, together with reverse osmosis product water, but only upon the dispensing of such product water.

FIG. 7 and its description have illustrated and described how raw water, actually in the embodiment disclosed raw water and the small amount of raw water surrounding the reverse osmosis filter membrane in the RO filter 28 (FIG. 1) may be mixed with product water in an amount selected to provide a desired total amount of dissolved solids in the ultimate product water dispensed by an RO filter system. The question then becomes whether such a system should be included in each RO filter system of the parallel processing reverse osmosis water filtration systems of the present invention or whether such mixing might be adequate with less than all such RO filter systems. That, of course, depends in part on the quality of the raw water before passing through any RO filter system. In particular, if the total amount of dissolved solids in the raw water is high, then perhaps mixing of raw water with the output of less than all RO filter systems would be adequate. However, since the quality of the raw water may vary substantially from location to location, from time to time, etc., it would be best to incorporate the concept of FIG. 7 into all RO filter systems in the parallel processing reverse osmosis water filtration systems of the present invention. Further, obviously different appliances may require different product water flow rates when active, and in fact perhaps only one of the lower flow rate requiring appliances is receiving product water at any one time. Therefore, the rate of flow of product water through line 66 (FIG. 7) and raw water from the RO filter membrane through line 70 may be quite low for any particular RO filter system at such time. Accordingly, it is possible that the proportion or ratio of raw water flow through needle valve 72 and through line 66 to the product water output line 52 (FIG. 7) of any particular RO filter system will vary with that flow rate, and accordingly, the proportion of the mixture may vary more than desired with such variation in flow rate. This, however, may be readily corrected by changing the nature of the needle in needle valve 72, or even changing the type of valve, to make the mixing proportions sufficiently independent of flow rates.

Figure 8:
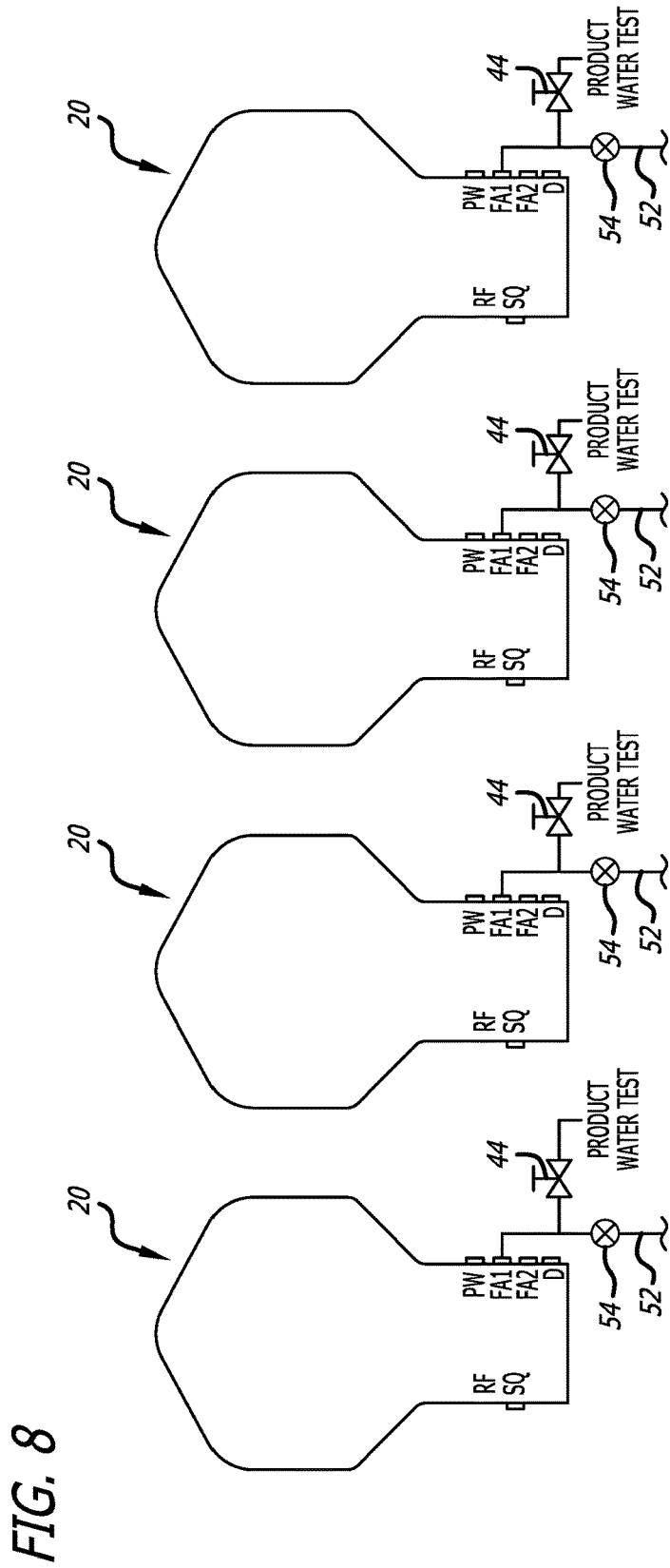
FIG. 8 illustrates exemplary connections to RO filter systems within parallel processing reverse osmosis water filtration systems of the present invention to allow obtaining test samples of product water from each RO filter system of a parallel processing reverse osmosis water filtration system.

Also, FIG. 3 illustrates a product water test valve 44 which may be used to test the output of any one of the three RO filter systems 20 shown in that FIG. by closing the manually operated on/off valves 42 of the other two RO filter systems in that assembly so that the output through product water test valve 44 for product water testing is simply the output of the one RO filter system being tested. This, of course, is certainly one way to test the output of each RO filter system to adjust its respective needle or metering valve 72, though this method has certain disadvantages. First, during that test, the only RO filter system 20 available for output of product water with the controlled total amount of dissolved solids to using devices and users is that single RO filter system under test, thereby substantially reducing the output flow capability of the parallel system during that test. Secondly, to obtain an accurate measure, the present contents of the line between the respective manually operated on/off valve 42 that is left open and product water test valve 44 for the product water test must, in essence, be flushed before an accurate reading can be obtained, thereby wasting more product water than necessary and taking more time than desired. Accordingly, in a system like shown in FIG. 4 (but without the additional storage), it would be desirable to be able to test and adjust the total amount of dissolved solids in the output of each RO filter system without having to shut off the output of the other RO filter systems and without having to flush any product water output line before running the test. This can easily be achieved as illustrated in FIG. 8, which FIG. illustrates an addition to a parallel processing reverse osmosis water filtration system containing four RO filter systems without optional storage. In particular, as illustrated in more detail in FIG. 4, each RO filter system 20 has a connection to product water output line 52 providing the output of the system. Accordingly this connection may be used to tap into the output of each RO filter system 20 prior to the respective on/off ball valve 54. Now to test the water from that RO filter system 20, that respective on/off ball valve 54 (refer to FIG. 7) is first shut off to prevent any backflow from other RO filter systems effecting the results, and then product water test valve 44 of FIG. 8 is opened (see FIG. 3 also).

The foregoing may not provide the desired total dissolved solids in the product water output line 52 with the desired repeatability when the optional additional product water storage shown in FIG. 4 is used. In such situations, the mixing of the squeeze water from the RO filter systems 20 may occur in product water output line 52 (FIG. 4), with the tapping for the test water occurring just after that mixing point. This, of course, is simply one possibility, with other possibilities being available.

There has been described herein parallel processing reverse osmosis water filtration systems which are highly versatile and readily expandable for commercial use and which may also provide adjustment and control of total dissolved solids when required. In that regard, in one embodiment all of the tubing connections are by way of push-in connections which automatically lock, though may be manually released if necessary (another form of quick connect/disconnect connector), all without requiring the use of tools, even hand tools. It should be noted further that such systems may be provided with more than a single output, such as by way of one example, a first output of the product water directly for an ice cube maker to provide crystal clear ice cubes and a second output having the desired total dissolved solids content for coffee.

Figure 9:
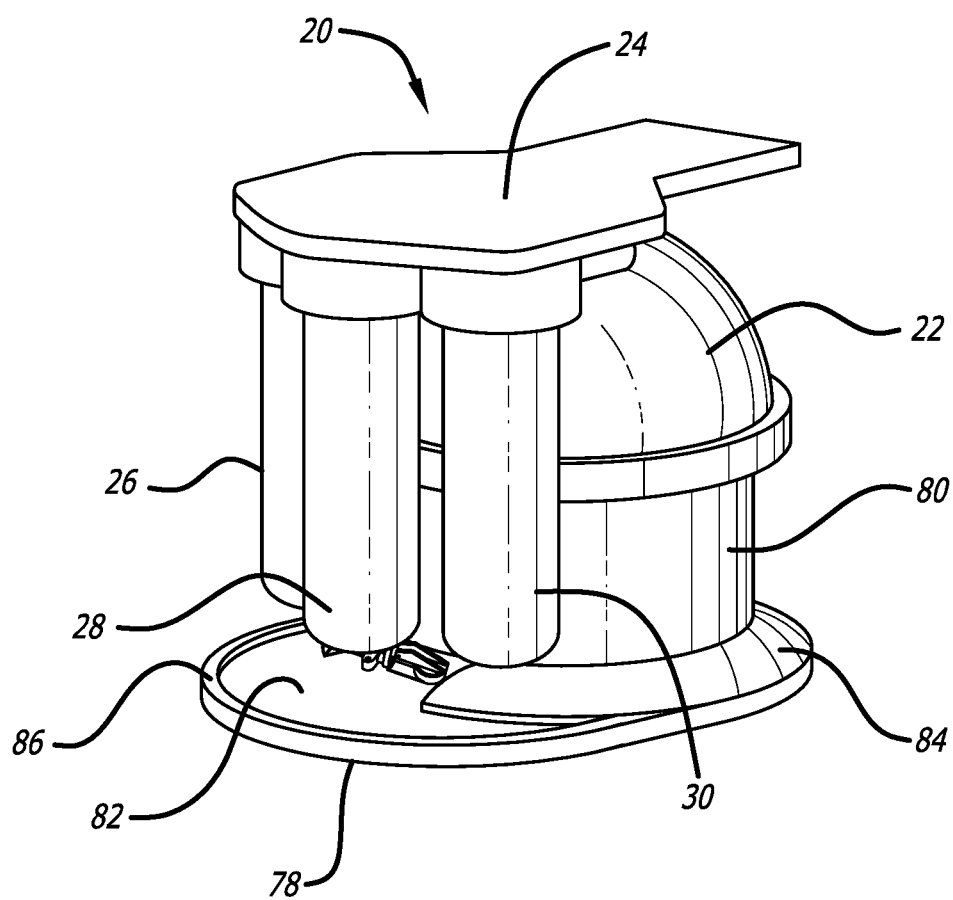
FIG. 9 is a perspective view of an RO filter system incorporating leak detection.

Now referring to FIG. 9, another embodiment of RO filter system 20 for use in the parallel processing reverse osmosis water filtration systems of the present invention may be seen. Parts of the RO filter system 20 particularly visible in this FIG. include filter cartridges 26, 28 and 30, the center of the three cartridges having the reverse osmosis filter membrane therein, and the product water storage tank 22, which components are coupled to a manifold assembly 24, which components are generally in accordance with the embodiment of FIG. 1. Also visible in FIG. 9 is a base or pan 78. The product water storage tank 22, while being basically spherical on the inside, also includes an integral molded skirt 80 (also shown in other Figs., such as FIG. 1) which provides a ring-like base for supporting the RO filter system loosely within the pan 78 on an intentionally interrupted, stepped ridge to allow any leakage of water to drain between the skirt 80 and the local pan edge 84, to flow out to the collection area 82 of the pan. In particular, the pan may be characterized as defining a substantially planar lowest top surface area 82, part of which has a further raised area for receiving the lower edge of the skirt 80 on the product water storage tank 22, with a still higher elevated region 84 to confine the skirt 80 to a generally concentric orientation with respect to the structure of the pan just described and to allow leakage water, if leakage occurs, to run down between the skirt 80 and the elevated region 84 on the pan 78. The generally planar surface 82 also extends outward under filters 26, 28 and 30 to collect any possible leakage there also, wherein its periphery is surrounded by a lip region 86.

Figure 10:
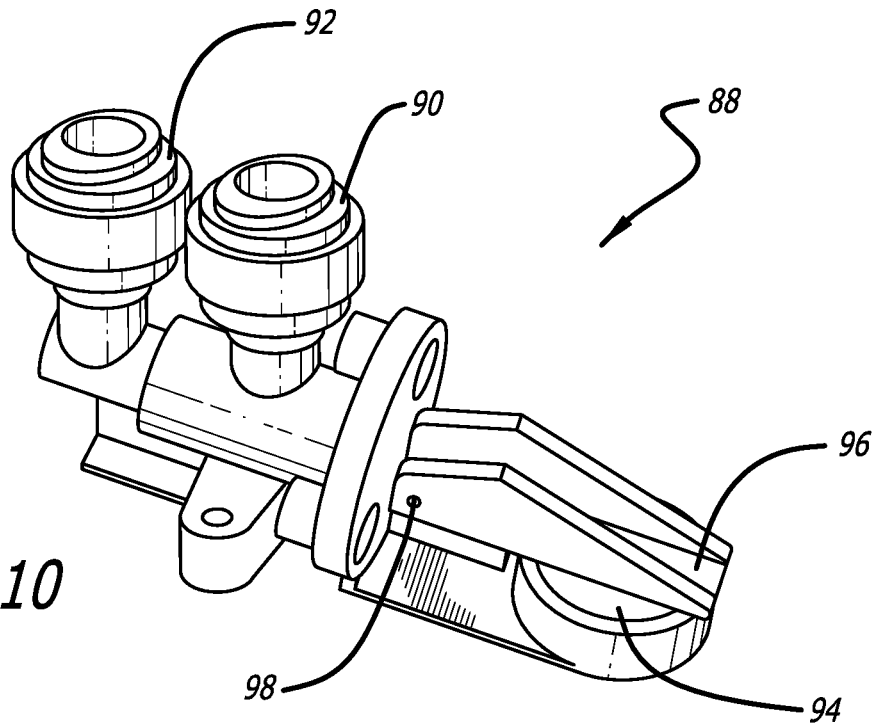
FIG. 10 is a view of a water sensing valve in a stable, valve open state.

Now referring to FIG. 10, a water sensing valve 88 may be seen. The water sensing valve 88 has an inlet connection 90 and an outlet connection 92, as well as an extension away from the inlet and outlet connection region to confine a moisture sensing pellet 94 under arm 96 shown in its first stable position, a valve open condition, which arm is rotatable around the axis of pin 98. If moisture sensing pellet 94 is subjected to any quantity of water, its outer covering will dissolve and the center thereof will swell to force arm 96 upward, at first pulling the water sensing valve 88 further toward the open condition against the spring, therein urging the water sensing valve 88 toward a closed position, after which the over center action resulting from the shape of arm 96 against the body of the water sensing valve 88 causes the water sensing valve 88 to snap to its second stable position shown in FIG. 11 to close the water sensing valve 88. Thereafter, water pressure on the inlet connection 90 only increases the force on the valve moving member toward to the closed position. Valves of this general type are available commercially from a number of venders, and in fact, the water sensing valve pictured herein is a commercially available valve.

Figure 12:
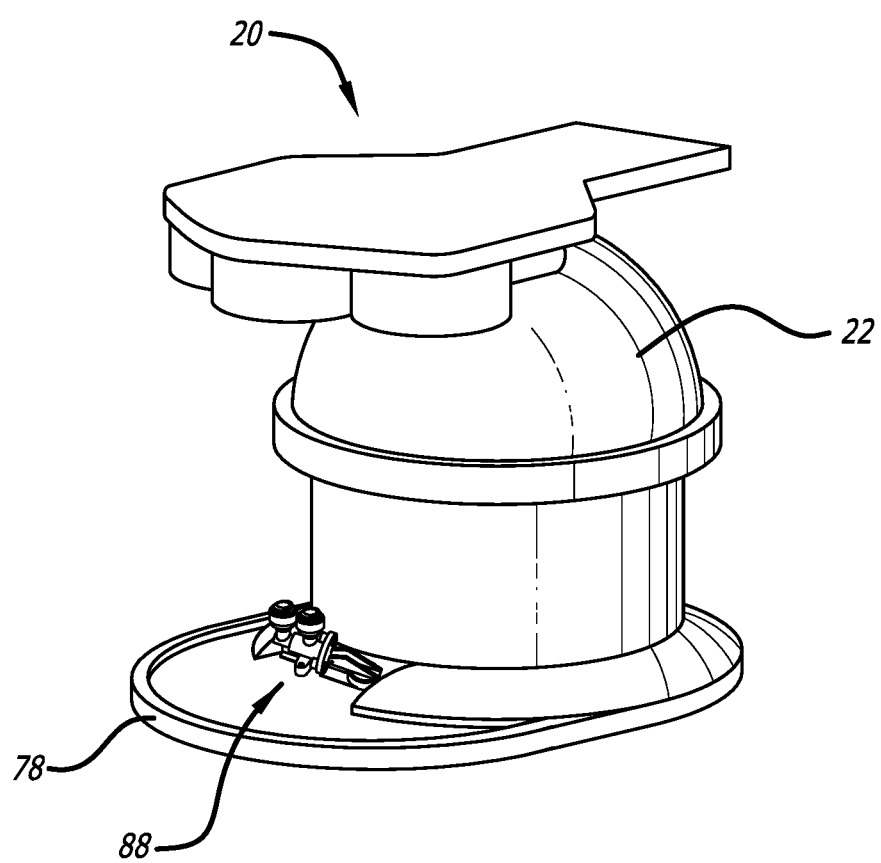
FIG. 12 is a view of an RO filter system with filters removed showing the water sensing valve in the RO filter system.

Now referring to FIG. 12, the water sensing valve 88 may be seen with its mounting screw holes placed over raised regions on pan 78, which positively locates the water sensing valve 88 with respect to the pan 78, with FIG. 9 showing the water sensing valve 88 positioned behind filter cartridges 26, 28 and 30 so as to not interfere with the removal and replacement of the filters. When so positioned, screws are then used to fasten the water sensing valve 88 to the pan 78.

Figure 11:
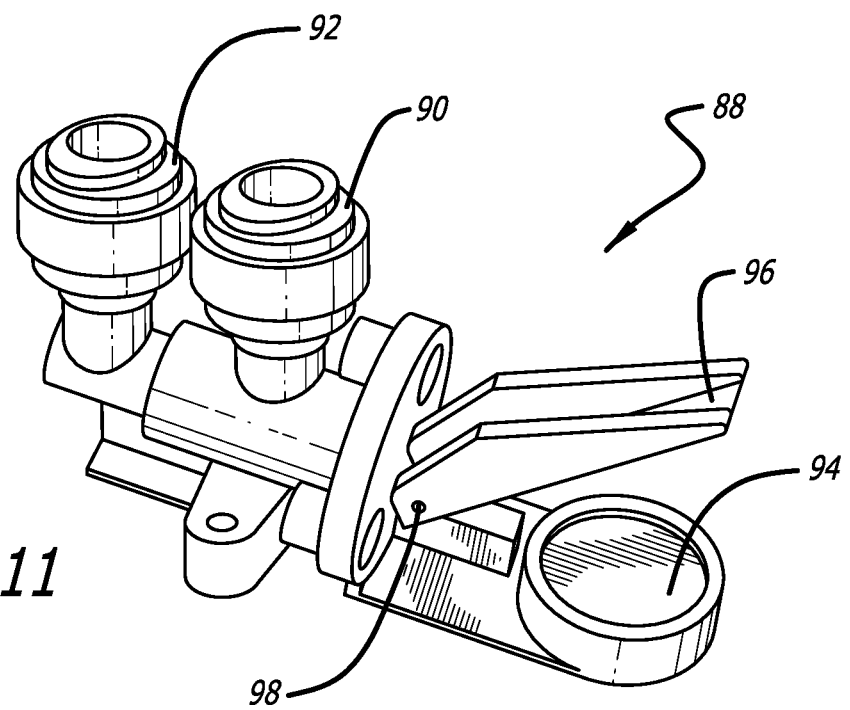
FIG. 11 is a view of the water sensing valve of FIG. 10 in a stable, valve closed state.

In normal operation, if a leak should ever occur in a particular RO filter system, water will accumulate in the substantially planar lowermost surface of the respective pan 82 (FIG. 9), triggering the moisture sensing pellet 94 which on swelling will trigger the over center action of the water sensing valve 88 from its open position, shown in FIG. 10, to its closed position shown in FIG. 11, shutting off all feed water to the respective RO filter system 20 until the leak is fixed, any accumulated water is cleaned up, the moisture sensing pellet in the water sensing valve 88 is replaced and the water sensing valve is reset to the valve open condition.

Figure 2:
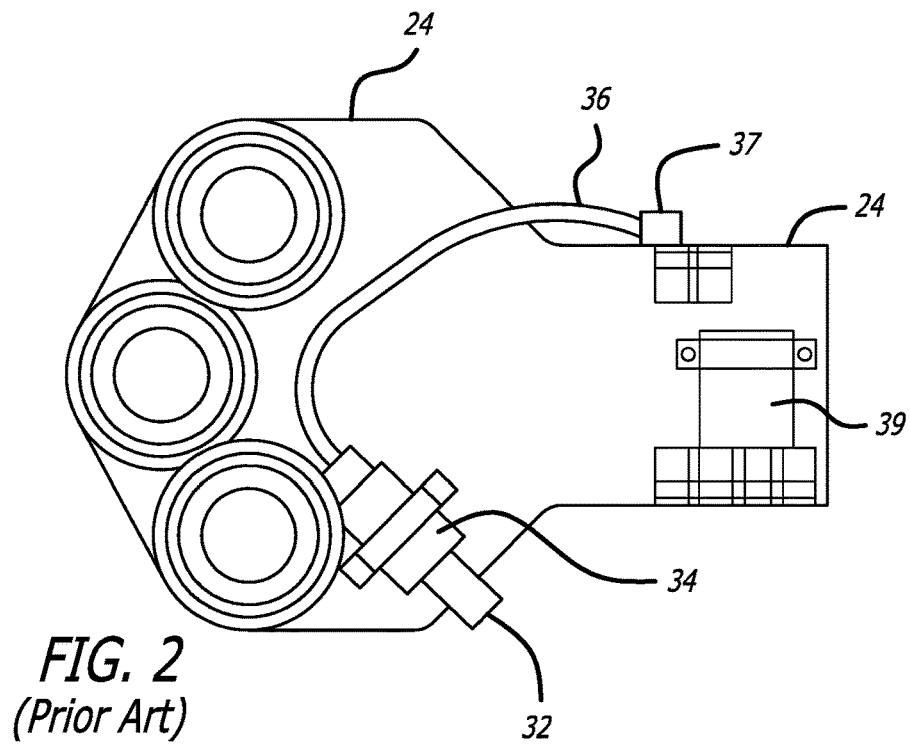
FIG. 2 is a view of the prior art RO filter system of FIG. 1 showing the control valve, and pressure regulator under the manifold assembly and its connections.
Figure 13:
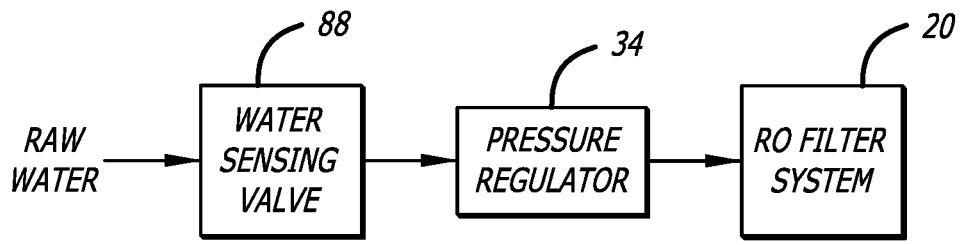
FIG. 13 is a block diagram illustrating one method of incorporating the water sensing valve into an RO filter system.
Figure 14:
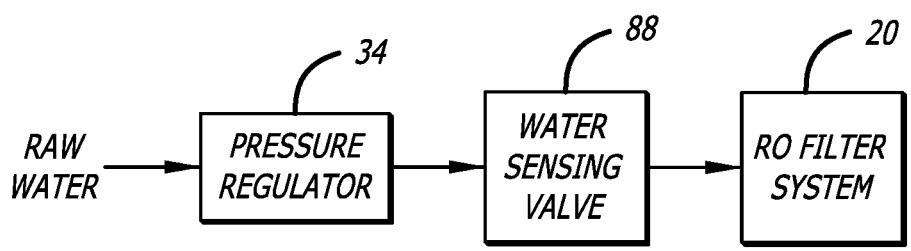
FIG. 14 is a block diagram illustrating an alternate method of incorporating the water sensing valve into an RO filter system.

As previously described, the specific RO filter systems for which the present invention is used include a pressure regulator 34, visible in FIG. 2, to which the source of raw water is connected so that the pressure regulated output of the pressure regulator 34 will limit the maximum pressure that the rest of the RO filter system will be exposed to, and to also avoid irregular and excessive product water production rates and associated problems. Accordingly, the present invention could be connected so that the source of raw water is connected to the inlet connection 90 of the water sensing valve 88 and the outlet connection 92 thereof is connected to the inlet to the pressure regulator 34 as shown in FIG. 13. Such a connection would mean that the water sensing valve 88, as well as the pressure regulator 34, would both have to tolerate the higher pressures of the raw water supply, whatever that might be. Alternatively, the raw water connection may be connected to the input to the pressure regulator 34, with the pressure regulated output thereof then going to the input of the water sensing valve 88, with the output of the water sensing valve then proceeding to the input to the rest of the RO filter system 20 as shown in FIG. 14. This results in the water sensing valve never being subjected to the highest pressures of the raw water supply, though has the disadvantage of having the pressure regulator and/or its connections be a possible source of leak not shut off by the water sensing valve.

If a leak occurs in the RO filter system, the water will run down the RO filter system assembly and accumulate in the pan 78 to trigger the over center mechanism of the water sensing valve 88 to shut off the water sensing valve, thereby limiting further leakage.

Water sensing valves of the foregoing type are well known for general use. However, in many cases, if used at all, they are placed on the floor under or next to an appliance. The production of what amounts to a complete parallel processing reverse osmosis water filtration system having a water collection pan at the bottom of each RO filter system, together with a water leakage sensing shutoff valve as an integral part of the RO filter system assembly, is clearly new and answers a long felt need, as it provides a clear protection to all users of the parallel processing reverse osmosis water filtration systems right out of the box, so to speak.

Figure 15:
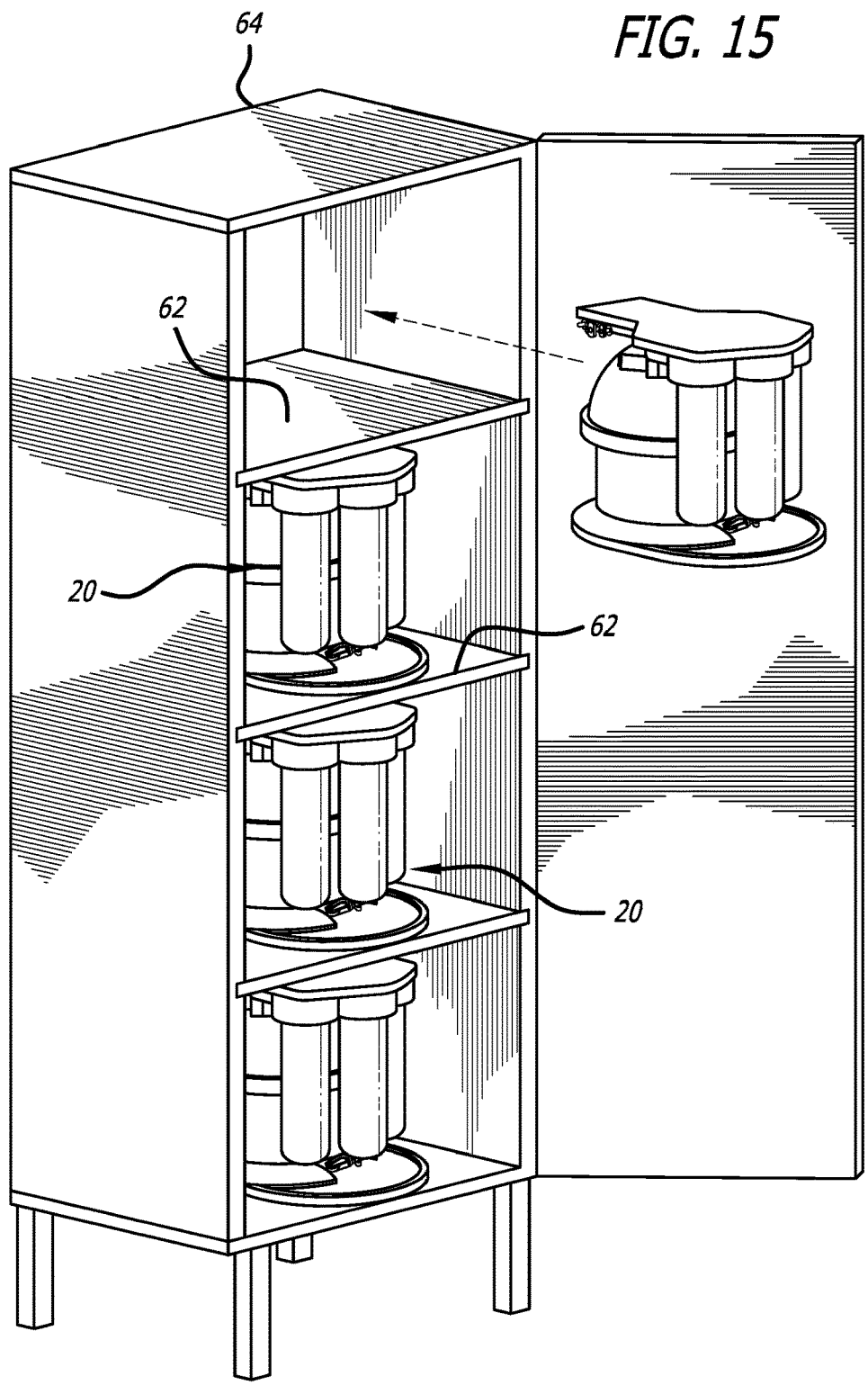
FIG. 15 is an illustration of a parallel processing reverse osmosis water filtration system similar to FIG. 5, but incorporating the leak detection of FIG. 9.

Now referring to FIG. 15, an illustration of a parallel processing reverse osmosis water filtration system using the embodiment of the RO filter system of FIG. 9 may be seen. In a preferred embodiment, the net result includes a squeeze water based parallel processing reverse osmosis water filtration system that can be easily maintained while remaining in service, provides uniform water production rates and uniform product water dispensing pressure, may include a control of total dissolved solids if desired, is readily expandable in production capacity, requires no electricity and a minimum of onsite assembly and construction, and which provides its own protection against a leak in a manner that may shut down one RO filter system, but not the entire parallel processing reverse osmosis water filtration system.

The present invention has been disclosed and described herein using the RO filter systems generally in accordance with U.S. Pat. No. 7,601,256 as exemplary only, as RO filter systems of other designs and even of other construction could be used if desired. While preferably a structurally independent and functionally independent pressure regulator is used that is part of the RO filter system assembly itself, a separate inline pressure regulator, a pressure regulator built into the RO filter system control valve or no pressure regulator can be used if desired. Also while squeeze water facilitated dispensing is used in preferred embodiments, air captive systems could be used if desired, as the parallel operation of multiple RO filter systems of any design results in certain advantageous results not heretofore obtainable in the prior art. Similarly, preferably RO filter systems not requiring any electricity for operation as in the embodiment disclosed are used, though RO filter systems that do require electricity can be used, as normally the parallel processing reverse osmosis water filtration systems of the present invention will be used in facilities wherein electricity could be made available, though frequently at an increased installation cost. In any event, the RO filter systems should be automatic, meaning that each RO filter system should respond to product water pressure in the product water output line 52 to initiate dispensing, RO filtering after dispensing to make up for the product water dispensed and then system shutdown. In preferred embodiments of the present invention, the use of a basic, mass produced squeeze water type RO filter system not requiring electricity in its operation results in minimum on site alteration, construction and assembly, both for initial installation and capacity expansion.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A parallel processing reverse osmosis water filtration system comprising:
   a plurality of automatic reverse osmosis filter systems, each having at least one removable filter containing a reverse osmosis membrane, each also having a product water storage tank, a control valve, a feed water input connection, a product water output connection and a waste water connection;
   the feed water input connections of the plurality of automatic reverse osmosis filter systems being coupled in parallel, each through a respective on/off valve to allow shutting off the feed water input connection to each automatic reverse osmosis filter system independent of the feed water input connection of each other automatic reverse osmosis filter system;
   the product water output connections of the plurality of automatic reverse osmosis filter systems being coupled in parallel to a product water output line, each through a respective on/off valve to allow shutting off the product water output connection of each automatic reverse osmosis filter system independent of each other automatic reverse osmosis filter system;
   whereby at least one of the plurality of automatic reverse osmosis filter systems may be decoupled from the parallel processing reverse osmosis water filtration system for changing any removable filter or filters attached thereto while allowing the remaining automatic reverse osmosis filter systems to be fully operative at that time;
   wherein each of the plurality of automatic reverse osmosis filter systems includes a pan at the bottom thereof as part of the respective automatic reverse osmosis filter system to contain any water leakage of the respective automatic reverse osmosis filter system, each pan also having a water sensing valve therein coupled in series with the rest of the respective automatic reverse osmosis filter system to shut off the feed water when the water sensing valve senses the presence of water.

2. The parallel processing reverse osmosis water filtration system of claim 1 wherein each of the plurality of automatic reverse osmosis filter systems includes a feed water pressure regulator as part of the automatic reverse osmosis filter system.

3. The parallel processing reverse osmosis water filtration system of claim 2 wherein the water sensing valve has an input connection for coupling to a source of feed water, the feed water pressure regulator being coupled to the water sensing valve.

4. The parallel processing reverse osmosis water filtration system of claim 2 wherein the feed water pressure regulator has an input connection for coupling to a source of feed water, the water sensing valve being coupled to feed water pressure regulator.

5. A parallel processing reverse osmosis water filtration system comprising:
   a plurality of identical automatic reverse osmosis filter systems, each having at least one removable filter containing a reverse osmosis membrane, each also having a product water storage tank, a control valve, a feed water input connection, a product water output connection and a waste water connection, each of the automatic reverse osmosis filter systems being a controllable squeeze water pressure system for dispensing product water;

the feed water input connections to the plurality of automatic reverse osmosis filter systems being coupled in parallel, each through a respective on/off valve to allow shutting off the feed water input connection to each automatic reverse osmosis filter system independent of the feed water input connection of each other automatic reverse osmosis filter system, the feed water input connections to each of the automatic reverse osmosis filter systems being coupled to a pressurized water source through a respective pressure regulator forming a part of the respective automatic reverse osmosis filter system;

the product water output connections of the plurality of automatic reverse osmosis filter systems being coupled in parallel to a product water output line, each through a respective on/off valve to allow shutting off the product water output connection of each automatic reverse osmosis filter system independent of each other automatic reverse osmosis filter system;

whereby at least one of the plurality of automatic reverse osmosis filter systems may be decoupled from the parallel processing reverse osmosis water filtration system for changing any removable filter or filters attached thereto while allowing the remaining automatic reverse osmosis filter systems to be fully operative at that time;

wherein each of the plurality of automatic reverse osmosis filter systems includes a pan at the bottom thereof as part of the respective automatic reverse osmosis filter system to contain any water leakage of the respective automatic reverse osmosis filter system, each pan also having a water sensing valve therein coupled in series with the rest of the respective automatic reverse osmosis filter system to shut off the feed water when the water sensing valve senses the presence of water.

6. The parallel processing reverse osmosis water filtration system of claim 5 wherein each of the plurality of automatic reverse osmosis filter systems includes a feed water pressure regulator as part of the automatic reverse osmosis filter system.

7. The parallel processing reverse osmosis water filtration system of claim 6 wherein the water sensing valve has an input connection for coupling to a source of feed water, the feed water pressure regulator being coupled to the water sensing valve.

8. The parallel processing reverse osmosis water filtration system of claim 6 wherein the feed water pressure regulator has an input connection for coupling to a source of feed water, the water sensing valve being coupled to feed water pressure regulator.

* * * * *